Nov. 7, 1939.    C. C. COX    2,179,467
COMBINATION LEVEL AND INCLINOMETER
Filed Aug. 10, 1938
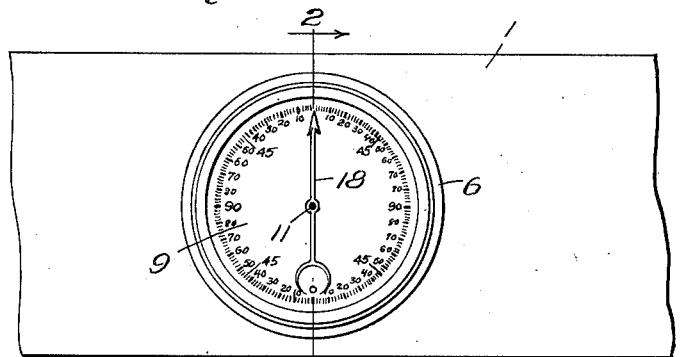
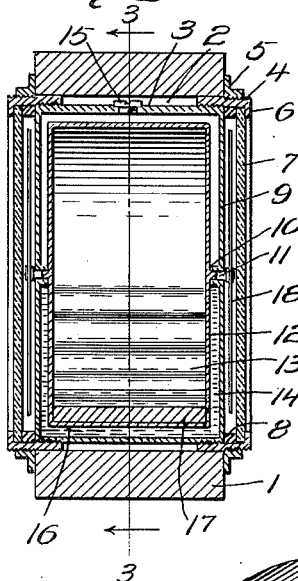
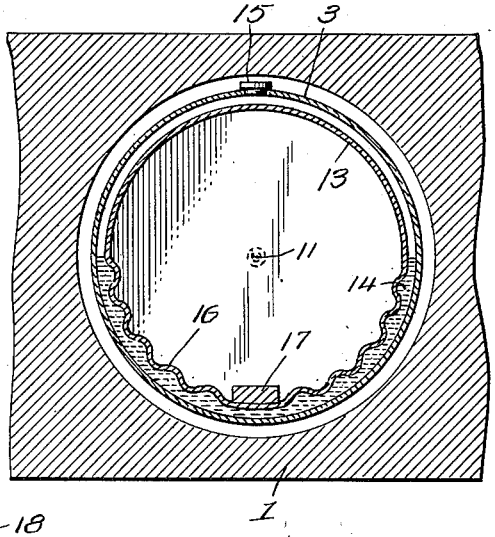
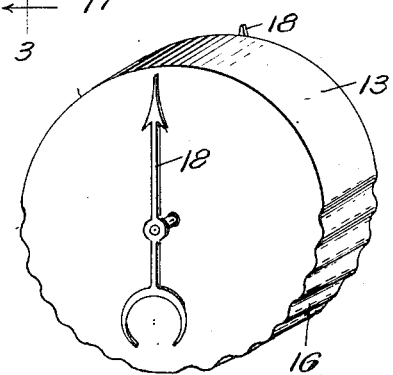
Charles C. Cox.
INVENTOR
BY *Victor J. Evans & Co.*
ATTORNEYS Patented Nov. 7, 1939

2,179,467

UNITED STATES PATENT OFFICE 2,179,467

COMBINATION LEVEL AND INCLINOMETER

Charles C. Cox, Pulaski, Va.

Application August 10, 1938, Serial No. 224,207

1 Claim. (Cl. 33—215)

This invention relates to a combination level and inclinometer, and its general object is to provide a device of that character that is capable of performing both of the functions of a level and an inclinometer in an accurate manner, in that friction between the parts thereof has been materially overcome, due to the fact that the movable parts are suspended or float in liquid, thereby relieving the weight thereof from their bearings.

A further object is to provide a combined level and inclinometer that includes a cylindrical float which is journaled and carries indicating pointers for cooperation with graduated dials, the float being weighted to properly balance the same, and includes damping means, to eliminate undue oscillation thereof.

Another object is to provide a device of the character set forth, that is simple in construction, inexpensive to manufacture, easy to use and to read and is extremely efficient in operation and service.

This invention also consists in certain other features of construction and in the combination and arrangement of the several parts, to be hereinafter fuly described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a fragmentary view of the device which forms the subject matter of the present invention.

Figure 2 is a sectional view taken approximately on line 2—2 of Figure 1, looking in the direction of the arrows.

Figure 3 is a sectional view taken approximately on line 3—3 of Figure 2, looking in the direction of the arrows.

Figure 4 is a perspective view of the pointer carrying float.

Referring to the drawing in detail, the reference numeral 1 indicates a stock of the usual elongated rectangular formation and which is provided with a circular opening 2 transversely arranged therein and extending through the side faces thereof, as best shown in Figure 2.

Mounted in the opening 2 is a cylindrical casing 3 which is shown as being of a width co-extensive with that of the stock, and the circumferential surface thereof is exteriorly threaded about the peripheral edge portions thereof to threadedly receive inner mounting rings 4 which cooperate with outer angular rings 5 threaded on the extending portions of the inner rings 4 for detachably securing the casing within the opening, as best shown in Figure 3, the angular rings being threaded against the faces of the stock for that purpose.

The outer mounting rings are provided with inwardly directed peripheral flanges 6 to provide rims for transparent cover disks 7 that bear against gaskets 8 disposed therebetween and the casing 3, and the gaskets 8 not only provide cushioning means for the cover disks 7, but space the same from the side walls 9 of the casing, as will be apparent.

The side walls 9 of the casing 3 have openings therein and inwardly extending from the openings which are disposed centrally of the walls 9, are bushings 10 for the purpose of receiving stub shafts 11 formed on and extending outwardly and centrally from the side walls 12 of a cylindrical shaped float 13, the float being of a size for disposal within the casing and to provide ample space between the float and casing to allow for free oscillation of the float. By that construction, it will be obvious that the float is in fact connected to the side walls 9 through the instrumentality of the bushings and stub shafts, and the latter are journaled in bushings, but the float is partially immersed in liquid 14 within the casing, so as to relieve the weight thereof from the bearings, thereby materially eliminating friction, which results in accurate and efficient operation of the device, as will be apparent.

The liquid is of course of non-freezing character, and is introduced within the casing through an opening in the cylindrical wall thereof that is closed by a plug cap 15, it being obvious that it is necessary to remove the casing from the stock when replenishing the supply of liquid, yet such is not required very often, due to the fact that evaporation or leakage is reduced to a minimum.

It will be noted as best shown in Figures 3 and 4 that the float is corrugated for approximately one-half of its circumference, and about that portion which is normally disposed within the liquid, and the corrugations which are indicated by the reference numeral 16 extend transversely of the cylindrical wall. It will be obvious that the corrugated portion of the float provides damping means therefor to eliminate undue oscillation thereof. The float is also weighted and for that purpose a strip 17 of weighted material is secured within the float transversely of the bottom thereof, as best shown in Figure 3.

Secured to the outer ends of the stub shafts 11 are pointers 18, in the form of arrows having substantially crescent shaped portions formed on the ends of the shafts thereof opposed to the arrow headed ends, as best shown in Figure 4, and as the pointers are fixed to the stub shafts and the latter in turn are fixed to the float, it will be obvious that the arrow headed ends of the pointers are normally held uppermost, as best shown in Figure 1, but the pointers travel in the space between the side walls of the casing and the transparent cover disks 7.

The side walls of the casing are graduated into degree marks for cooperation with the pointers, and the degree marks are suitably numbered as best shown in Figure 1.

From the above description and disclosure of the drawing, it is believed that the use of my device will be obvious, therefore description accordingly is deemed unnecessary.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A combined level and inclinometer comprising a stock having an opening therein, a cylindrical casing mounted in the stock and having graduated side walls providing dials, liquid within the casing, a hollow cylindrical float partially immersed within the liquid, stub shafts fixed to the float and journaled in and extending through the side walls, pointers fixed to the extending ends of the stub shafts to be carried by the float and movable with respect to the dials for cooperation with the graduations thereof, a weight fixed in the lower portion of the float and extending transversely throughout the width thereof, the cylindrical wall of the float being corrugated for a portion of its circumference to provide damping means to eliminate undue oscillation of said float, transparent cover disks for the dials and means for securing the casing within the opening and the cover disks with respect to the dials.

CHARLES C. COX.